(12) United States Patent
Ogiso

(10) Patent No.: US 6,526,745 B1
(45) Date of Patent: Mar. 4, 2003

(54) INTERNAL COMBUSTION ENGINE HAVING A VARIABLE VALVE MECHANISM AND CONTROL METHOD THEREFOR

(75) Inventor: Makoto Ogiso, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/718,429

(22) Filed: Nov. 24, 2000

(30) Foreign Application Priority Data

Dec. 24, 1999 (JP) .......................................... 11-366592

(51) Int. Cl.[7] .............................................. F01N 3/00
(52) U.S. Cl. ............................ 60/285; 60/274; 60/277; 123/90.15; 123/321; 123/325; 123/493
(58) Field of Search ......................... 60/274, 277, 285, 60/286; 123/90.11, 198 DB, 321, 325, 481, 493

(56) References Cited

U.S. PATENT DOCUMENTS

| 4,491,115 A | * | 1/1985 | Otobe et al. ................. 123/493 |
| 4,729,220 A | * | 3/1988 | Terasaka et al. .............. 60/285 |
| 4,938,179 A | * | 7/1990 | Kawamura ................ 123/90.11 |
| 4,976,228 A | * | 12/1990 | Kawamura ................ 123/90.11 |
| 5,094,206 A | * | 3/1992 | Buslepp et al. ............. 123/325 |
| 5,117,790 A | * | 6/1992 | Clarke et al. ............... 123/321 |
| 5,337,720 A | * | 8/1994 | Murakami et al. ........... 123/481 |
| 5,558,051 A | * | 9/1996 | Yoshioka ..................... 123/493 |
| 5,570,575 A | * | 11/1996 | Sato et al. ...................... 60/277 |
| 5,622,049 A | * | 4/1997 | Kitamura et al. .............. 60/285 |
| 5,743,083 A | * | 4/1998 | Schnaibel et al. ............. 60/277 |
| 5,784,800 A | * | 7/1998 | Toshiro et al. ................. 60/277 |
| 5,930,992 A | * | 8/1999 | Esch et al. ................ 123/90.11 |
| 6,021,638 A | * | 2/2000 | Hochmuth .................... 60/274 |
| 6,155,217 A | * | 12/2000 | Shiraishi et al. ............. 123/321 |
| 6,269,793 B1 | * | 8/2001 | Russ et al. .................. 123/325 |
| 6,279,523 B1 | * | 8/2001 | Iida et al. ................. 123/90.11 |

FOREIGN PATENT DOCUMENTS

JP    A-10-115234    5/1998

* cited by examiner

Primary Examiner—Thomas Denion
Assistant Examiner—Tu M. Nguyen
(74) Attorney, Agent, or Firm—Oliff & Berridge, PLC

(57) ABSTRACT

An internal combustion engine having a variable valve mechanism is capable of altering opening and closing timings and opening amounts of at least one of an intake valve and an exhaust valve of the internal combustion engine. A fuel injection valve supplies fuel either directly or indirectly to a combustion chamber of the internal combustion engine. A forcible valve closing mechanism controls the variable valve mechanism such that at least one of the intake valve and the exhaust valve is placed in a closed state when the fuel injection valve is prohibited from operating. New gas is prevented from flowing from the exhaust system of the internal combustion engine to the intake system thereof when fuel injection control is prohibited.

19 Claims, 5 Drawing Sheets

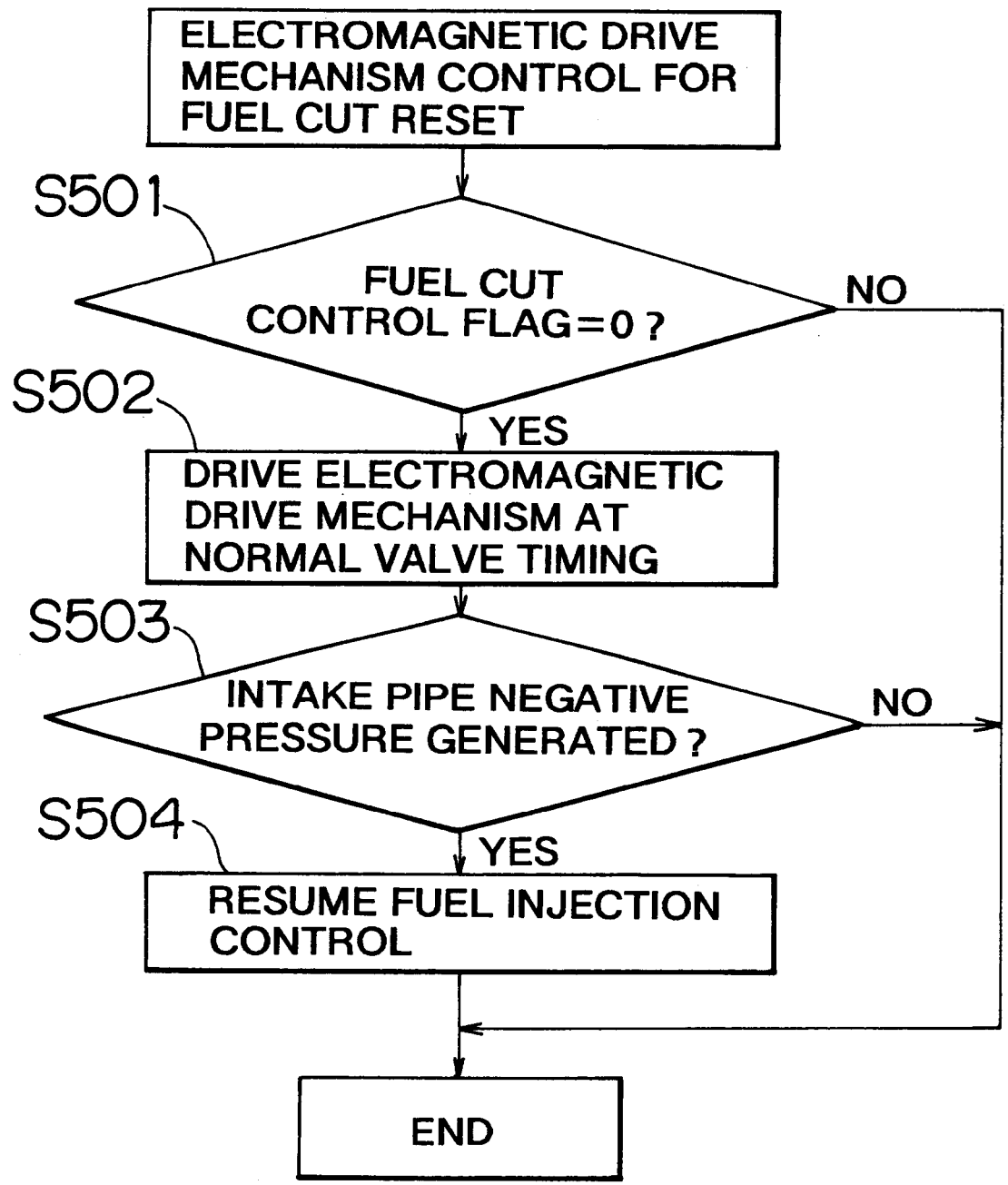

INTERNAL COMBUSTION ENGINE HAVING A VARIABLE VALVE MECHANISM AND CONTROL METHOD THEREFOR

INCORPORATION BY REFERENCE

The disclosure of Japanese Patent Application No. HEI 11-366592 filed on Dec. 24, 1999 including the specification, drawings, and abstract is incorporated herein by reference in its entirety.

BACKGROUND OF THE INVENTION

1. Field of Invention

The invention relates to an internal combustion engine mounted in a vehicle and the like. In particular, the invention relates to an internal combustion engine having a variable valve mechanism capable of arbitrarily altering the opening and closing timing and/or the opening amount of an intake valve and exhaust valve, and to a control method therefor.

2. Description of Related Art

Recent years have seen advances in the development of internal combustion engines for mounting in a vehicle and the like that are provided with a variable valve mechanism capable of arbitrarily altering the opening and closing timing and/or the opening amount of at least one of an intake valve and an exhaust valve with the aim of improving exhaust emissions and reducing fuel consumption.

An electromagnetic drive type moving valve mechanism has been proposed as an example of a variable valve mechanism for driving an intake valve and an exhaust valve of an internal combustion engine to open and close using electromagnetic force. In this electromagnetic drive valve type of moving valve mechanism, because there is no need to drive the intake and exhaust valve to open and close using the rotation force of the engine output shaft (crankshaft), loss in mechanical output originating in the drive of the intake and exhaust valve is prevented.

Moreover, because it is also possible to open and close the intake and exhaust valve at the desired timing with no limitations imposed by the position of rotation of the engine output shaft, it is possible to control the amount of air intake into each cylinder without using an intake aperture valve (a throttle valve). As a result, pumping loss in the air intake caused by the throttle valve can be suppressed and the amount of fuel consumption of the internal combustion engine can be reduced.

Moreover, in an internal combustion engine mounted in a vehicle and the like, fuel cut control, in which fuel injection is halted when the vehicle is running in a state of deceleration, is performed in order to reduce emissions and reduce the amount of fuel consumption.

Namely, when the fuel injection is halted while the engine output shaft of the internal combustion engine is in a state of rotation, generation and combustion of the air-fuel mixture in the internal combustion engine does not take place and air that has been taken into the internal combustion engine is expelled in its existing state. As a result, as well as the amount of fuel consumption in the internal combustion engine being improved, emissions are reduced.

Moreover, exhaust purifying catalysts are provided in the exhaust system of an internal combustion engine mounted in a vehicle and the like for purifying harmful gas components such as hydrocarbons (HC), carbon monoxide (CO), and nitrogen oxides (NOx) contained in the exhaust gas expelled from the internal combustion engine.

However, because these exhaust purifying catalysts have catalytic substances such as platinum (Pt), palladium (Pd), rhodium (Rh) and the like on the surface of a catalyst carrier in which a plurality of exhaust flow passages are formed, if the above described fuel cut control is performed and the concentration of oxygen in the exhaust gas increases, there is a tendency for oxygen and various oxides to adhere to the surface of the catalytic substance. This phenomenon is most marked when the temperature of the exhaust purifying catalyst is high and, in some cases, has caused the purifying capability of the catalytic substance to deteriorate.

In response to this, it is possible to consider a method in which fuel cut control is prohibited when the temperature of the exhaust purifying catalyst rises above a predetermined temperature, however, the problem then is that this leads to increases in the amount of fuel consumption and emissions.

To counter such problems, a valve timing control device for an internal combustion engine has been proposed in Japanese Patent Application Laid-Open (JP-A) No. 10-115234.

The valve timing control device for an internal combustion engine described in the above publication operates in the following manner. An internal combustion engine is provided with a camshaft for driving an intake valve and an exhaust valve to open and close using the rotation force of the engine output shaft and also provided with a variable valve mechanism for altering the opening and closing timing of the lift amount of the intake valve and/or the exhaust valve. When fuel cut control is performed, the variable valve mechanism is controlled so as to shorten the time that the intake valve is open in the air intake step of each cylinder, thereby reducing the amount of air flowing from the intake system to the exhaust system and, accordingly, suppressing deterioration of the exhaust purifying catalyst caused by oxygen.

Because there is only a small amount of air flowing from the intake system of the internal combustion engine to the exhaust system thereof, it is possible to delay the advance of the deterioration of the exhaust purifying catalyst caused by oxygen. However, it is difficult to completely prevent deterioration of the exhaust purifying catalyst caused by oxygen.

In particular, because the exhaust purifying catalyst is easily deteriorated due to oxygen when the temperature of the exhaust purifying catalyst is high, the concern exists that the exhaust purifying catalyst will deteriorate due to oxygen even when there is only a small amount of air flowing through the exhaust purifying catalyst.

SUMMARY OF THE INVENTION

An aim of the invention, therefore, is to provide a technology for preventing deterioration in the exhaust purifying catalyst due to fuel cut control and thereby improving the durability of the exhaust purifying catalyst in an internal combustion engine.

A first aspect of the invention is an internal combustion engine having a variable valve mechanism capable of altering opening and closing timings and/or opening amounts of at least one of an intake valve and an exhaust valve of an internal combustion engine; a fuel injection valve for supplying fuel either directly or indirectly to a combustion chamber of the internal combustion engine; and a forcible valve closing device that controls at least one of the intake valve and the exhaust valve to be closed when the fuel injection valve is prohibited from operating.

In an internal combustion engine having a variable valve mechanism structured in this way, when the fuel injection valve is prohibited from operating, the forcible valve closing device controls the variable valve mechanism such that at least one of the intake valve and exhaust valve to be in a closed state.

When at least one of the intake valve and exhaust valve is placed in a closed state in an internal combustion engine, there is no flow of air from the intake system to the exhaust system of the internal combustion engine. As a result, the exhaust system of the internal combustion engine is not placed in an oxygen abundant atmosphere, and the exhaust purifying catalyst provided in the exhaust system is not placed in an oxygen abundant atmosphere.

Moreover, in the internal combustion engine having a variable valve mechanism according to the invention, the forcible valve closing device may also synchronize for each cylinder a timing when the fuel injection valve is prohibited from operating with a timing when the intake valve and/or the exhaust valve are placed in a closed state.

This is to prevent events such as the following from occurring:

(1) If the timing at which the intake valve is placed in a closed state is earlier than the timing at which the fuel injection valve is prohibited from operating, then in an intake port injection type of fuel combustion engine, fuel injected from the fuel injection valve adheres to the intake port and intake valve and, when the fuel cut control is ended, the adhered fuel is taken into the cylinders together with the fuel newly injected from the fuel injection valve, thereby placing the interior of the cylinders in a fuel abundant atmosphere.

(2) If the timing at which the intake valve is placed in a closed state is later than the timing at which the fuel injection valve is prohibited from operating, then air flows from the intake system of the internal combustion engine to the exhaust system thereof, and the exhaust purifying catalyst provided in the exhaust system is placed in an oxygen abundant atmosphere.

(3) If the timing at which the exhaust valve is placed in a closed state is earlier than the timing at which the fuel injection valve is prohibited from operating, there is back flow into the intake system of non-combusted fuel-air mixture and combusted gas in the combustion chamber.

(4) If the timing at which the exhaust valve is placed in a closed state is later than the timing at which the fuel injection valve is prohibited from operating, then air flows from the intake system of the internal combustion engine to the exhaust system thereof, and the exhaust purifying catalyst provided in the exhaust system is placed in an oxygen abundant atmosphere.

In an internal combustion engine having a variable valve mechanism according to the invention, the variable valve mechanism is controlled such that at least one of the intake valve and the exhaust valve is placed in a closed state only when the injection of fuel from the fuel injection valve is prohibited and the temperature of the exhaust purifying catalyst provided in the exhaust system of the internal combustion engine is equal to or greater than a predetermined temperature.

A second aspect of the invention is an internal combustion engine having a variable valve mechanism capable of altering opening and closing timings and/or opening amounts of at least one of an intake valve and an exhaust valve of an internal combustion engine; a fuel injection valve for supplying fuel either directly or indirectly to each cylinder of the internal combustion engine; and valve timing altering device that alters the timings at which the intake valve and exhaust valve are opened and closed are set at the timings at which gas flows from the exhaust system to the intake system of the internal combustion engine when the fuel injection valve is prohibited from operating.

In an internal combustion engine having a variable valve mechanism structured in this way, when the fuel injection valve is prohibited from operating, the valve timing altering device controls the variable valve mechanism such that the timing at which the intake and exhaust valves are opened and closed is set at the timing at which gas flows from the exhaust system to the intake system of the internal combustion engine.

In this case, gas flows from the exhaust system to the intake system of the internal combustion engine, and there is no flow of air from the intake system to the exhaust system of the internal combustion engine. As a result, the exhaust system of the internal combustion engine is not placed in an oxygen abundant atmosphere, and the exhaust purifying catalyst provided in the exhaust system is not placed in an oxygen abundant atmosphere.

At the same time as the timings of the opening and closing of the intake and exhaust valves are set as the timings at which gas flows from the intake system to the exhaust system of the internal combustion engine in a portion of the cylinders of the internal combustion engine, in the remaining cylinders, the timings of the opening and closing of the intake and exhaust valves are set as the timings at which gas flows from the exhaust system to the intake system of the internal combustion engine.

In this case, because the gas flowing from the intake system to the exhaust system via a portion of the cylinders is drawn back to the intake system from the exhaust system via the remaining cylinders, no air passes through the exhaust purifying catalyst.

Moreover, in the internal combustion engine having the above described variable valve mechanism, it is also possible for the valve timing altering means to synchronize for each cylinder a time when the fuel injection valve is prohibited from operating with a time at which the timings of the opening and closing of the intake valve and the exhaust valve are altered.

Moreover, in the internal combustion engine having the above described variable valve mechanism, it is also possible for the variable valve mechanism to alter the timings at which the intake valve and the exhaust valve are opened and closed only when the injection of fuel from the fuel injection valve is prohibited and the temperature of the exhaust purifying catalyst is equal to or greater than a predetermined temperature.

Any of the following exemplary variable valve mechanisms may be used according to the invention: an electromagnetic drive type moving valve mechanism in which the intake and exhaust valves are driven using electromagnetic force; a hydraulic drive type moving valve mechanism moving valve mechanism in which the intake and exhaust valves are driven using hydraulic force; a variable valve mechanism in an internal combustion engine provided with a camshaft that drives the intake and exhaust valves, wherein the variable valve mechanism switches between operating and stopping the intake and exhaust valves by switching the mode of transmission of the driving force between the camshaft and the intake and exhaust valves; or a variable valve mechanism in an internal combustion engine provided with a camshaft that drives the intake and exhaust valves, wherein the variable valve mechanism alters the opening and closing timings of the intake and exhaust valves by altering the rotation phase of the camshaft relative to the crankshaft.

BRIEF DESCRIPTION OF THE DRAWINGS

The foregoing and further objects, features and advantages of the present invention will become apparent from the following description of preferred embodiments with reference to the accompanying drawings, wherein:

FIG. 5 is a flow chart showing the electromagnetic drive mechanism control routine during a fuel cut reset operation.

DETAILED DESCRIPTION OF PREFERRED EMBODIMENTS

A specific embodiment of the internal combustion engine having a variable valve mechanism according to the invention will now be described based on the drawings. The example of a variable valve mechanism according to the invention described in this case is of an electromagnetic drive mechanism for driving an intake valve and exhaust valve to open and close using electromagnetic force. However, the invention is not limited to such a mechanism.

Figure 1:
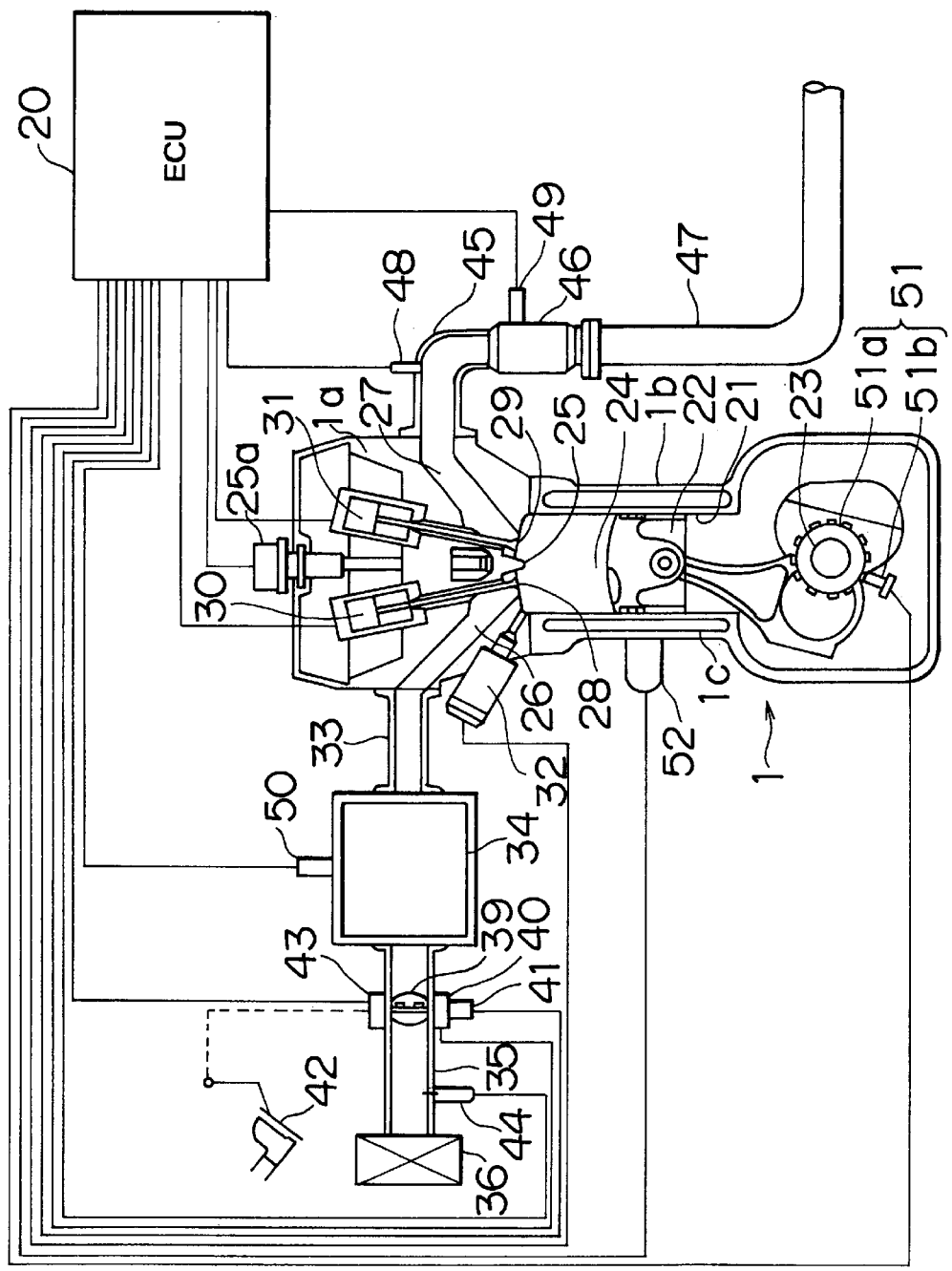
FIG. 1 is a diagram showing the schematic structure of an internal combustion engine having a variable valve mechanism according to the invention.

FIG. 1 is a diagram showing the schematic structure of an internal combustion engine having a variable valve mechanism according to the invention. The internal combustion engine 1 shown in FIG. 1 is a four cycle gasoline engine provided with a plurality of cylinders 21 and also equipped with a fuel injection valve 32 for injecting fuel directly into each cylinder 21. It is possible for the invention to use a fuel injection valve for supplying fuel indirectly to each cylinder.

The internal combustion engine 1 is provided with a cylinder block 1b in which the plurality of cylinders 21 and a cooling water passage 1c are formed, and a cylinder head 1a fixed to the top of the cylinder block 1b.

A crankshaft 23 that is an engine output shaft is supported so as to be freely rotatable by the cylinder block 1b. This crankshaft 23 is linked to pistons 22 loaded inside each cylinder 21 so as to be able to slide freely therein.

Combustion chambers 24 are formed above the pistons 22 by the top surface of the piston 22 and the side walls of the cylinder head 1a. Spark plugs 25 are attached to the cylinder head 1a so as to face the combustion chambers 24. An igniter 25a for applying a drive current to the spark plugs 25 is connected to the spark plugs 25.

The open ends of two intake ports 26 and the open ends of two exhaust ports 27 are formed in the cylinder head 1a facing towards the combustion chambers 24. Fuel injection valves 32 are also attached to the cylinder head 1a such that the nozzles thereof face the combustion chamber 24.

Each of the open ends of the intake ports 26 can be opened and closed by an intake valve 28 supported so as to be able to advance and retract freely in the cylinder head 1a. The intake valves 28 are driven so as to open and close by an electromagnetic drive mechanism 30 (referred to below as the intake side electromagnetic drive mechanism 30) provided in the cylinder head 1a.

Each of the open ends of the exhaust ports 27 can be opened and closed by an exhaust valve 29 supported so as to be able to advance and retract freely in the cylinder head 1a. The exhaust valves 29 are driven so as to open and close by an electromagnetic drive mechanism 31 (referred to below as the exhaust side electromagnetic drive mechanism 31) provided in the cylinder head 1a.

Here, the specific structure of the intake side electromagnetic drive mechanism 30 and the exhaust side electromagnetic drive mechanism 31 will be described. Note that, because the intake side electromagnetic drive mechanism 30 and the exhaust side electromagnetic drive mechanism 31 have the same structure, only the intake side electromagnetic drive mechanism 30 will be described in the example.

Figure 2:
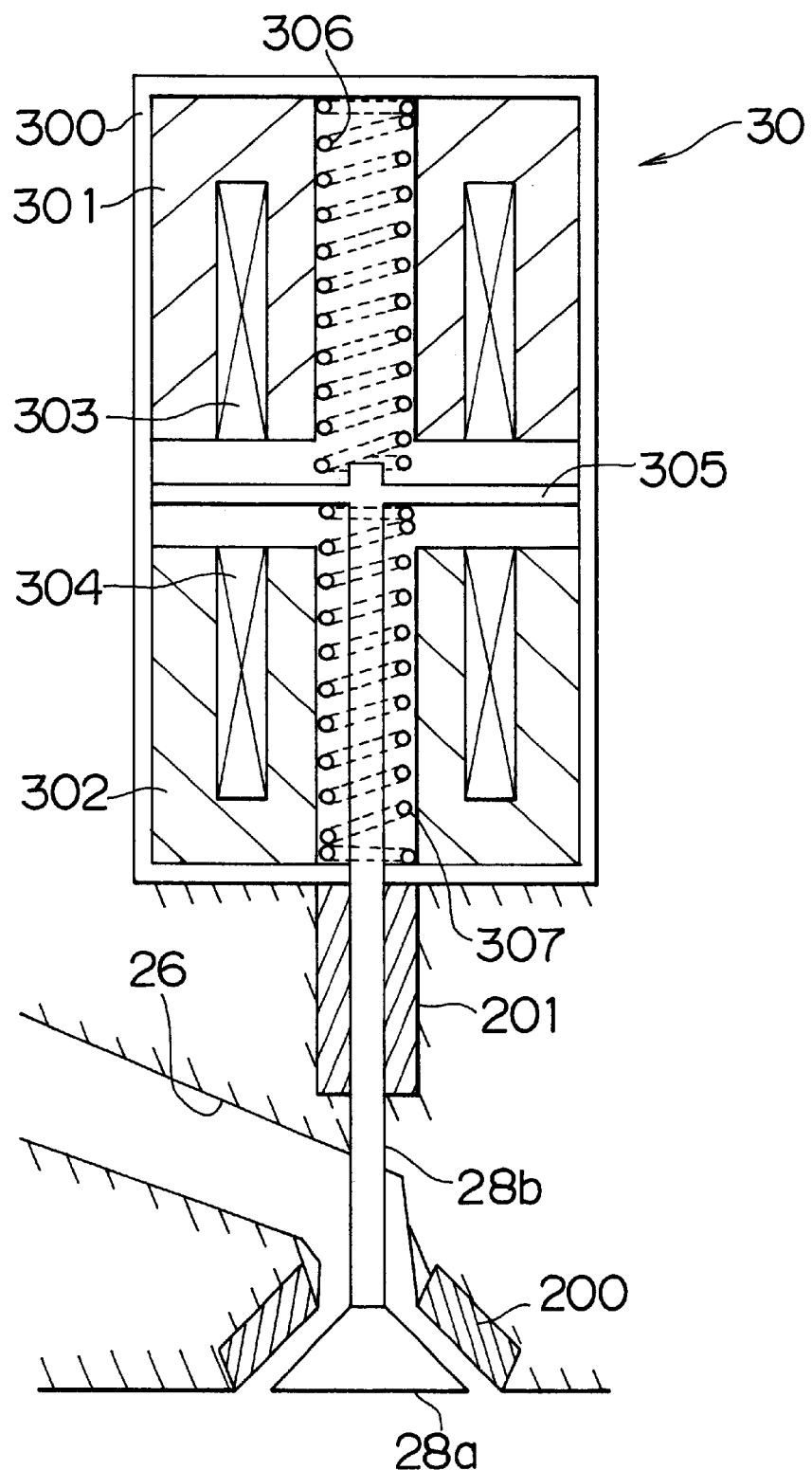
FIG. 2 is a diagram showing the structure of the intake side electromagnetic drive mechanism.

As is shown in FIG. 2, the intake side electromagnetic drive mechanism 30 is provided with a cabinet body 300 comprising a non-magnetic body formed in a cylindrical shape. A first core 301 and a second core 302, comprising ring-shaped soft magnetic bodies having an outer diameter substantially the same size as the inner diameter of the cabinet body 300, are placed in series separated by a predetermined gap in the cabinet body 300.

A first electromagnetic coil 303 is held at a position facing the predetermined gap in the first core 301. A second electromagnetic coil 304 is held at a position facing first electromagnetic coil 303 in the second core 302.

A plunger 305, comprising a circular plate-shaped soft magnetic body having an outer diameter substantially the same size as the inner diameter of the cabinet body 300, is provided in the predetermined gap. The plunger 305 is supported by a first spring 306 held in a hollow portion of the first core 301 and by a second spring 307 held in a hollow portion of the second core 302 so as to be able to advance and retract freely in an axial direction.

The urging force of the first spring 306 and the second spring 307 is set so as to be balanced when the plunger 305 is in a position in the center between the first core 301 and the second core 302 in the predetermined gap.

The intake valve 28 is formed from a valve body 28a, which opens and closes the intake port 26 by being seated in or separated from a valve seat 200 provided at the open end of the intake port 26 in the combustion chamber 24, and a valve shaft 28b shaped like a solid cylinder having the distal end portion thereof fixed to the valve body 28a.

The valve shaft 28b is supported by a cylindrical valve guide 201 provided in the cylinder head 1a so as to be able to freely advance and retract. The base end portion of the valve shaft 28b extends into the cabinet body 300 of the intake side electromagnetic drive mechanism 30, and is fixed to the plunger 305 via the hollow portion of the second core 302.

The length of the axial direction of the valve shaft 28b is set such that, when the plunger 305 is held in a position midway between the first core 301 and the second core 302 in the predetermined gap, namely, when the plunger 305 is in a neutral state, the valve body 28a is held in a position midway between the fully open displacement end and the fully closed displacement end (referred to below as the mid-open position).

In the intake side electromagnetic drive mechanism 30 constructed in this way, when no exciting current is being applied to the first electromagnetic coil 303 and the second magnetic coil 304, the plunger 305 is placed in the neutral state and, consequently, the valve body 28a is held in the mid-open position.

If an exciting current is applied to the first electromagnetic coil 303 in the intake side electromagnetic drive mechanism 30, an electromagnetic force is generated between the first core 301, the first electromagnetic coil 303, and the plunger 305 so as to displace the plunger 305 towards the first core 301.

If, however, an exciting current is applied to the second electromagnetic coil 304 in the intake side electromagnetic drive mechanism 30, an electromagnetic force is generated between the second core 302, the second electromagnetic coil 304, and the plunger 305 so as to displace the plunger 305 towards the second core 302.

As a result, by applying exciting current alternately to the first electromagnetic coil 303 and the second electromagnetic coil 304 in the intake side electromagnetic drive mechanism 30, the plunger 305 is advanced and retracted and, accordingly, the valve body 28a is driven to open and close. At this time, by altering the size of the exciting current and the timing of the application of the exciting current to the first electromagnetic coil 303 and the second electromagnetic coil 304, it is possible to control the valve opening amount and the opening and closing timing of the intake valve 28.

Returning now to FIG. 1, each intake port 26 of the internal combustion engine 1 communicates with an intake branch pipe 33 mounted on the cylinder head 1a of the internal combustion engine 1. Each intake branch pipe 33 is connected to a surge tank 34 for suppressing intake surges. An intake pipe 35 is connected to the surge tank 34. The intake pipe 35 is connected to an air cleaner box 36 for removing dust and impurities from the air intake.

An airflow meter 44 for outputting electric signals corresponding to the mass of the new air flowing through the intake pipe 35 (i.e. the mass of the air that is taken in) is attached to the intake pipe 35. A throttle valve 39 for adjusting the flow amount of the intake flowing through the intake pipe 35 is provided at a position downstream of the airflow meter 44 in the intake pipe 35.

A throttle actuator 40 comprising a stepper motor or the like for driving the throttle valve 39 to open and close in accordance with the size of the power applied thereto, a throttle position sensor 41 for outputting electric signals corresponding to the degree of the opening of the throttle valve 39, and an accelerator position sensor 43, mechanically connected to the accelerator pedal 42, for outputting electric signals corresponding to the amount of operation of the accelerator pedal 42 are attached to the throttle valve 39.

A vacuum sensor 50 for outputting electric signals corresponding to the pressure within the surge tank 34 is attached to the surge tank 34.

In contrast, each exhaust port 27 of the internal combustion engine 1 communicates with an exhaust branch pipe 45 mounted on the cylinder head 1a. Each exhaust branch pipe 45 is connected to an exhaust pipe 47 via an exhaust purifying catalyst 46. The downstream end of the exhaust pipe 47 is connected to an unillustrated muffler.

An air-fuel ratio sensor 48 for outputting electrical signals corresponding to the air-fuel ratio of the exhaust gas flowing through the exhaust branch pipe 45 and into the exhaust purifying catalyst 46 is attached to the exhaust branch pipe 45.

The exhaust purifying catalyst 46 may be any one of the catalysts described below or may be an appropriate combination of any of these catalysts. Namely, a three way catalyst for purifying hydrocarbons (HC), carbon monoxide (CO), and nitrogen oxides (NOx) in the exhaust gas when the air-fuel ratio of the exhaust gas flowing into the exhaust purifying catalyst 46 is a predetermined air-fuel ratio close to a theoretical air-fuel ratio; an occlusion reduction type NOx catalyst for occluding nitrogen oxides (NOx) in the exhaust gas when the air-fuel ratio of the exhaust gas flowing into the exhaust purifying catalyst 46 is a lean air-fuel ratio, and for reducing and purifying as it discharges occluded nitrogen oxides (NOx) when the air-fuel ratio of the inflowing exhaust gas is a theoretical air-fuel ratio or is a rich air-fuel ratio; and a selection reduction type NOx catalyst for reducing and purifying nitrogen oxides (NOx) in the exhaust gas when the air-fuel ratio of the exhaust gas flowing into the exhaust purifying catalyst 46 is oxygen abundant and a predetermined reduction agent is present.

A catalyst temperature sensor 49 for outputting electrical signals corresponding to the floor temperature of the exhaust purifying catalyst 46 is attached to the exhaust purifying catalyst 46.

The internal combustion engine 1 is also provided with a crank position sensor 51 comprising a timing rotor 51a attached to the end portion of the crank shaft 23 and an electromagnetic pickup 51b attached to the cylinder block 1b in the vicinity of the timing rotor 51a, and a water temperature sensor 52 attached to the cylinder block 1b for detecting the temperature of the cooling water flowing through the cooling water passage 1c formed within the internal combustion engine 1.

An electronic control unit 20 (referred to below as an ECU) is also provided in the internal combustion engine 12 having the above described structure for controlling the operating state of the internal combustion engine 1.

The ECU 20 is connected via electrical wiring to various sensors such as throttle position sensor 41, accelerator position sensor 43, airflow meter 44, air-fuel ratio sensor 48, catalyst temperature sensor 49, vacuum sensor 50, crank position sensor 51, and water temperature sensor 52. Output signals of each of these sensors are input into the ECU 20.

The igniter 25a, the intake side electromagnetic drive mechanism 30, the exhaust side electromagnetic drive mechanism 31, the fuel injection valve 32, the throttle actuator 40, and the like are connected via electrical wiring to the ECU 20. The ECU 20 is able to control the igniter 25a, the intake side electromagnetic drive mechanism 30, the exhaust side electromagnetic drive mechanism 31, the fuel injection valve 32, and the throttle actuator 40 with output signal values of the various sensors as parameters.

Figure 3:
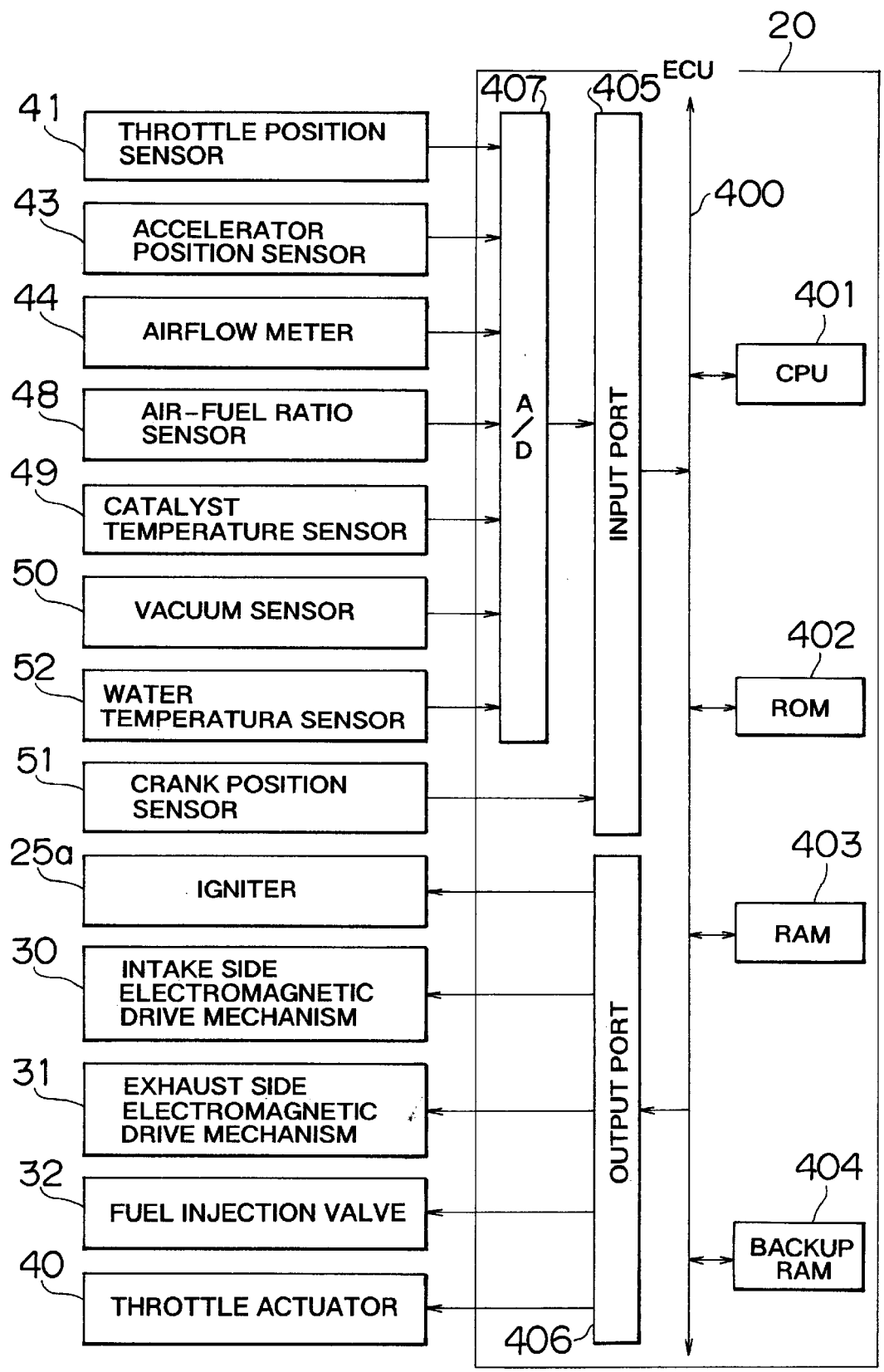
FIG. 3 is a block diagram showing the internal structure of an ECU.

As is shown in FIG. 3, the ECU 20 is provided with a CPU 401, ROM 402, RAM 403, backup RAM 404, an input port 405, and an output port 406 which are connected to each other via a bidirectional bus 400. The ECU 20 is also provided with an A/D converter (A/D) 407 connected to the input port 405.

The input port 405 receives the input of output signals from sensors that output signals in a digital signal format such as the crank position sensor 51, and transmits these output signals to the CPU 401 and the RAM 403.

The input port 405 also receives the input via the A/D 407 of output signals of sensors that output signals in an analog signal format such as the throttle position sensor 41, the accelerator position sensor 43, the airflow meter 44, the air-fuel ratio sensor 48, the catalyst temperature sensor 49, the vacuum sensor 50, and the water temperature sensor 52 and transmits these output signals to the CPU 401 and the RAM 403.

The output port 406 transmits control signals output from the CPU 401 to the igniter 25a, the intake side electromagnetic drive mechanism 30, the exhaust side electromagnetic drive mechanism 31, the fuel injection valve 32, and the throttle actuator 40.

The ROM 402 stores an electromagnetic drive mechanism control routine during fuel cut control for controlling the electromagnetic drive mechanism when fuel cut control is being performed, and an electromagnetic drive mechanism control routine during fuel cut restoration for controlling the electromagnetic drive mechanism when fuel cut control is being ended. In addition, ROM 402 stores application programs such as: a fuel injection amount control routine for deciding the fuel injection amount; a fuel injection timing control routine for deciding the fuel injection timing; an intake valve opening timing control routine for deciding the timing of the valve opening of the intake valve 28; an intake valve opening amount control routine for deciding the amount of the valve opening of the intake valve 28; an exhaust valve opening timing control routine for deciding the timing of the valve opening of the exhaust valve 29; an exhaust valve opening amount control routine for deciding the amount of the valve opening of the exhaust valve 29; an ignition timing control routine for deciding the ignition timing of the spark plug 25 of each cylinder 21; and a throttle opening amount control routine for deciding the opening amount of the throttle valve 39.

The ROM 402 stores various control maps in addition to the above application programs. Examples of these control maps include: a fuel injection amount control map showing the relationship between the operating state of the internal combustion engine 1 and the fuel injection amount; a fuel injection timing control map showing the relationship between the operating state of the internal combustion engine 1 and the fuel injection timing; an intake valve opening timing control map showing the relationship between the operating state of the internal combustion engine 1 and the valve opening timing of the intake valve 28; an intake valve opening amount control map showing the relationship between the operating state of the internal combustion engine 1 and the valve opening amount of the intake valve 28; an exhaust valve opening timing control map showing the relationship between the operating state of the internal combustion engine 1 and the valve opening timing of the exhaust valve 29; an exhaust valve opening amount control map showing the relationship between the operating state of the internal combustion engine 1 and the valve opening amount of the exhaust valve 29; an ignition timing control map showing the relationship between the operating state of the internal combustion engine 1 and the ignition timing of each of the spark plugs 25; a throttle opening amount control map showing the relationship between the operating state of the internal combustion engine 1 and the opening amount of the throttle valve 39; and a fuel cut control map showing the relationship between the operating state of the internal combustion engine 1 and the timing of the performing of the fuel cut control.

The RAM 403 stores output signals of each sensor, calculation results of the CPU 401, and the like. An example of a calculation result is the number of engine revolutions calculated on the basis of output signals from the crank position sensor 51. The various bits of data stored in the RAM 403 are rewritten as the latest data each time the crank position sensor 51 outputs a signal.

The backup RAM 404 is non-volatile memory that retains data even after the internal combustion engine 1 has stopped operating, and stores learnt values according to each of the various controls and the like.

The CPU 401 operates in accordance with the application programs stored in the ROM 402, and performs the electromagnetic drive mechanism control when a fuel cut is performed and the electromagnetic drive mechanism control when a fuel cut is restored (the essence of the invention), in addition to fuel injection control, intake valve opening and closing control, exhaust valve opening and closing control, and ignition control.

The electromagnetic drive mechanism control when a fuel cut is performed and restored according to the present embodiment will now be described.

Figure 4:
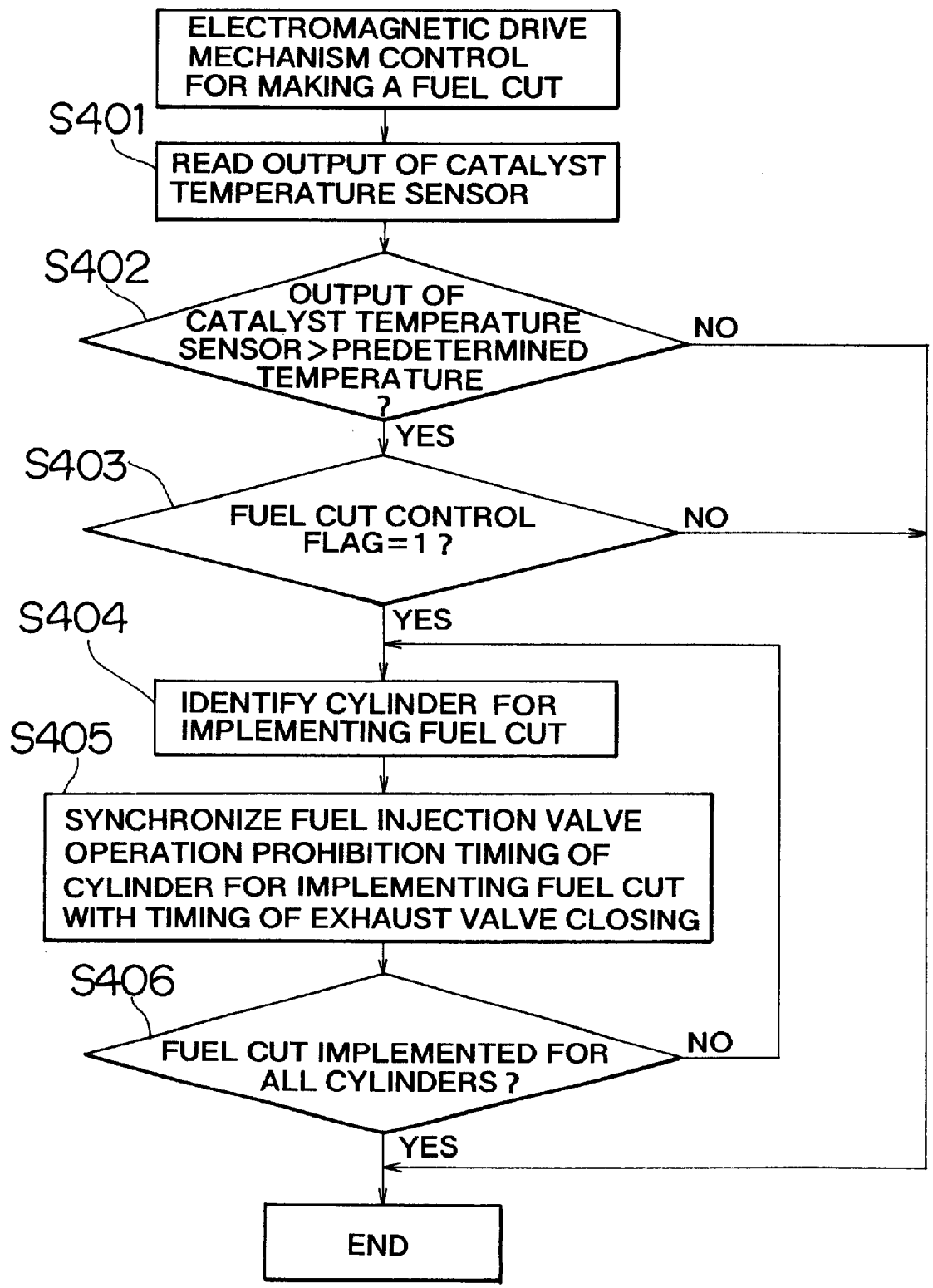
FIG. 4 is a flow chart showing an electromagnetic drive mechanism control routine during a fuel cut operation.

The CPU 401 performs an electromagnetic drive mechanism control routine for making a fuel cut, such as that shown in FIG. 4, whenever electromagnetic drive mechanism control for making a fuel cut is performed. This electromagnetic drive mechanism control routine for making a fuel cut is repeatedly performed by the CPU 401 at predetermined times (for example, each time the crank position sensor 51 emits a pulse signal).

In the electromagnetic drive mechanism control routine for making a fuel cut, in step S401, the CPU 401 first reads from the RAM 403 an output signal value of the catalyst temperature sensor 49 (the catalyst floor temperature).

In step S402, the CPU 401 determines whether or not the catalyst floor temperature read in step S401 is higher than a predetermined temperature. This predetermined temperature is one at which oxygen and oxides easily adhere to the catalytic material of the exhaust purifying catalyst 46 and is a value that is determined in advance experimentally.

If it is determined in step S402 that the catalyst floor temperature is equal to or less than the predetermined temperature, the CPU 401 temporarily ends the current routine. If, however, it is determined in step S402 that the catalyst floor temperature is higher than the predetermined temperature, the CPU 401 proceeds to step S403.

In step S403, the CPU 401 determines whether or not "1" is stored in the fuel cut control flag storage area set in a predetermined area in the RAM 403. 1 is stored in the fuel cut control flag storage area when it is determined in a separate fuel cut control routine that the operating state of the internal combustion engine 1 is in the area for performing fuel cut control. 0 is stored in the fuel cut control flag storage area when it is determined in the fuel cut control routine that the operating state of the internal combustion engine 1 is not in the area for performing fuel cut control.

If it is determined in step S403 that 1 is not stored in the fuel cut control flag storage area of the RAM 403, namely, if it is determined that 0 is stored in the fuel cut control flag storage area, the CPU 401 temporarily ends the current routine.

If, however, it is determined that 1 is stored in the fuel cut control flag storage area, the CPU 401 proceeds to step S404 and identifies the cylinder 21 that is at the timing for implementing fuel cut control. Namely, the CPU 21 identifies the cylinder 21 at the fuel injection timing.

In step S405, the CPU 402 controls the exhaust side electromagnetic drive mechanism 31 so as to place the exhaust valve 29 of the cylinder 21 in an open state in synchronization with a timing in which the operation of the fuel injection valve 32 of the cylinder 21 identified in step S404 is prohibited.

In step S406, the CPU 401 determines whether or not the operation of the fuel injection valves 32 of all the cylinders 21 has been prohibited, in other words, whether fuel cut control has been performed for all the cylinders 21. One example of a method for making this determination is a method in which areas for storing fuel cut implementation completion flags are provided separately for each cylinder 21 in the RAM 403, and it is determined that fuel cut control has been implemented for all the cylinders 21 when fuel cut implementation completion flags corresponding to all the cylinders 21 are stored in these storage areas.

If it is determined in step S406 that fuel cut control has not been implemented for all the cylinders 21, the CPU 401 performs the processing of step S404 and thereafter, described above, for the cylinders 21 for which fuel cut control has not been implemented.

If it is determined in step S406 that fuel cut control has been implemented for all the cylinders 21, the CPU 401 ends the processing of the current routine.

The forcible valve closing device according to the invention is realized by the CPU 401 executing the electromagnetic drive mechanism control routine for making a fuel cut in this manner. When the fuel cut control is implemented when the catalyst floor temperature of the exhaust purifying catalyst 46 is higher than a predetermined temperature, the exhaust valves 29 in each of the cylinders 21 in the internal combustion engine 1 are held in a closed-valve state.

In this case, there is no leakage of gas from the combustion chambers 24 of the internal combustion engine 1 to the exhaust system. In other words, because there is no flow of new gas from the intake system of the internal combustion engine 1 to the exhaust system, thereof, the exhaust purifying catalyst 46 is not placed in an oxygen abundant atmosphere.

Accordingly, when fuel cut control is performed in the internal combustion engine 1, because the exhaust purifying catalyst 46 is not placed in an oxygen abundant atmosphere, oxygen and oxides do not adhere to the catalytic substance of the exhaust purifying catalyst 46 and there is no decrease in the purifying capabilities of the exhaust purifying catalyst 46.

Moreover, in the electromagnetic drive mechanism control routine for making a fuel cut, because the timing of the implementation of the fuel control for each cylinder 21 in the internal combustion engine 1 is synchronized with the timing of the closing of the exhaust valves 29, there is no back flow into the intake system of combusted gas in the combustion chamber and non-combusted fuel-air mixture, nor is there any generation of malfunctions such as air flowing from the intake system to the exhaust system after the fuel control has been implemented.

In the above described electromagnetic drive mechanism control routine for making a fuel cut, an example is described in which the exhaust valve 29 is placed in a closed state when the fuel cut control is performed. However, it is also possible to place the intake valve 28 in a closed state instead of the exhaust valve 29, or to place both the intake valve 28 and the exhaust valve 19 in closed states.

Next, the CPU 401 performs an electromagnetic drive mechanism control routine for fuel cut reset, such as that shown in FIG. 5, each time the electromagnetic drive mechanism control for fuel cut reset is performed. This electromagnetic drive mechanism control routine for fuel cut reset is repeatedly performed by the CPU 401 at predetermined times (for example, each time the crank position sensor 51 emits a pulse signal) under the conditions in which the fuel cut control was performed.

In the electromagnetic drive mechanism control routine for fuel cut reset, in step S501, the CPU 401 firstly accesses the fuel cut control flag storage area in the RAM 403 and determines whether the storage contents of the fuel cut control flag storage area have been rewritten from 1 to 0.

If the determination in step S501 is that the storage contents of the fuel cut control flag storage area have not been rewritten from 1 to 0, namely, if the determination is that 1 is stored in the fuel cut control flag storage area, the CPU 401 temporarily ends the current routine.

If, however, the determination in step S501 is that the storage contents of the fuel cut control flag storage area have been rewritten from 1 to 0, namely, if the determination is that 0 is stored in the fuel cut control flag storage area, the CPU 401 proceeds to step S502.

In step S502, the CPU 401 controls the intake side electromagnetic drive mechanism 30 and the exhaust side electromagnetic drive mechanism 31 such that the intake valve 28 and the exhaust valve 29 are operated at the normal opening and closing timings.

Here, it is assumed that, when the fuel cut control is ended, there is a sufficient amount of new gas in a portion of the cylinders 21 of the internal combustion engine 1 and that there is an insufficient amount of new gas in the remaining portion of the cylinders. If this is the case, if the fuel injection valves are reopened at the same time as the normal operation of the intake and exhaust valves 28 and 29 is resumed, normal combustion takes place in the cylinders 21 in which the new gas is present, while normal combustion does not take place inside the cylinders 21 in which no new gas is present, and the concern exists that variations in the rotation of the combustion engine 1, in other words, variations in the torque of the combustion engine 1, will be generated.

Therefore, in the present embodiment, when the fuel cut control is ended, the intake valve 28 and the exhaust valve 29 are first operated for several cycles at their normal opening and closing timings, thereby causing new gas to be taken into all of the cylinders 21. Thereafter, the fuel injection control of each cylinder 21 is resumed.

Returning here to FIG. 5, the CPU 401, having finished executing the processing of step S502, proceeds to step S503, where it reads output signal values of the vacuum sensor 50 (the intake air pipe negative pressure) from the RAM 403, and determines whether the intake pipe negative pressure is lower than a predetermined value. In other words, this step determines whether the level of the intake pipe negative pressure is now higher than a predetermined negative pressure level value.

The processing in step S503 is intended to determine whether or not new gas has been introduced into each of the cylinders 21, and is based on the knowledge that, in a normal internal combustion engine, because the throttle valve is placed in a completely closed state when the fuel cut control is performed, if the intake valve 28 and the exhaust valve 29 are operated at their normal opening and closing timings under such conditions, then the new gas remaining in the intake passage from the throttle valve to the internal combustion engine is taken into the combustion chamber of the internal combustion engine, and the intake passage downstream of the throttle valve is placed is placed in a negative pressure state.

If it is determined in step S503 that the intake passage negative pressure is higher than the predetermined value, namely, if it is determined that the level of the intake pipe negative pressure is lower than the predetermined negative pressure level value, the CPU 401 temporarily ends the current routine.

If, however, it is determined in step S503 that the intake passage negative pressure is lower than the predetermined value, namely, if it is determined that the level of the intake pipe negative pressure is higher than the predetermined negative pressure level value, the CPU 401 proceeds to step S504 where, after the fuel injection has been resumed for each of the cylinders 21, the current routine is ended.

As a result of the CPU 401 performing this type of electromagnetic drive mechanism control routine for fuel cut reset, when the fuel cut control is ended, because the fuel injection control is resumed after sufficient new gas has been taken into all of the cylinders 21 of the internal combustion engine 1, it becomes possible to make the combustion state in all the cylinders 21 in the internal combustion engine 1 substantially uniform when the fuel cut control has been completed, and it becomes possible to improve the drivability without generating any torque variation and any variation in the rotation of the internal combustion engine 1.

In the example of the electromagnetic drive mechanism control for making a fuel cut according to the above described embodiment, at least one of the intake valve 28 and the exhaust valve 29 is placed in a closed-valve state. However, it is also possible to control the intake side electromagnetic drive mechanism 30 and the exhaust side electromagnetic drive mechanism 31 such that the timing of the intake valve 28 and the exhaust valve 29 are set as timings at which gas flows from the exhaust system of the internal combustion engine to the intake system.

Specifically, the CPU 401 controls the intake side electromagnetic drive mechanism 30 such that the intake valve 28 is opened at the timing when the piston 22 in each cylinder 21 of the internal combustion engine 1 is rising upwards from the bottom dead point towards the top dead point. The CPU 401 also controls the exhaust side electromagnetic drive mechanism 31 such that the exhaust valve 29 is opened at the timing when the piston 22 in each cylinder 21 of the internal combustion engine 1 is dropping downwards from the top dead point towards the bottom dead point.

In this case, because the piston 22 in each cylinder 21 is dropping when the exhaust valve 29 is open, the exhaust system gas is taken into the combustion chamber 24. Thereafter, when the intake valve 28 is open, the gas in the combustion chamber 24 is expelled into the intake system by the rising action of the piston 22.

As a result, when the fuel cut control is performed in the internal combustion engine 1, because the gas flows from the exhaust system of the internal combustion engine 1 to the intake system thereof, the new gas of the intake system does not flow into the exhaust system and, consequently, the exhaust purifying catalyst 46 is not placed in an oxygen abundant atmosphere.

Further, in the electromagnetic drive mechanism control for making a fuel cut, when the opening and closing timings of the intake valve 28 and the exhaust valve 29 are set at the timing at which the gas flows from the exhaust system of the internal combustion engine 1 to the intake system thereof, because engine braking is generated by the pump action of the internal combustion engine 1 without the exhaust purifying catalyst 46 being placed in an oxygen abundant atmosphere, this is effective for fuel cut control when a vehicle is traveling in a state of deceleration.

In the electromagnetic drive mechanism control for making a fuel cut, when the opening and closing timings of the intake valve 28 and the exhaust valve 29 are set at the timing at which the gas flows from the exhaust system of the internal combustion engine 1 to the intake system thereof, it is preferable that the throttle actuator 40 is controlled such that the throttle valve 39 is placed in a completely closed state.

The reason for this is because, when the timings of the opening and closing of the intake valve 28 and the exhaust valve 29 are set at the timing at which the gas flows from the exhaust system of the internal combustion engine 1 to the intake system thereof, if the throttle valve 39 is in an open state, air is sucked from the portion of the end point of the exhaust system that is open to the atmosphere and passes through the exhaust purifying catalyst 46.

Moreover, in the electromagnetic drive mechanism control for making a fuel cut, as a result of the CPU 401 controlling the intake side electromagnetic drive mechanism 30 and the exhaust side electromagnetic drive mechanism 31 such that the opening and closing timings of the intake valve 28 and exhaust valve 29 of a portion of the cylinders 21 of the internal combustion engine 1 are set at the timing at which gas flows from the exhaust system of the internal combustion engine 1 to the intake system thereof, as well as controlling the intake side electromagnetic drive mechanism 30 and the exhaust side electromagnetic drive mechanism 31 such that the opening and closing timings of the intake valve 28 and exhaust valve 29 of the remaining portion of the cylinders 21 of the internal combustion engine 1 are set at the timing at which gas flows from the intake system of the internal combustion engine 1 to the exhaust system thereof, it is possible for the gas between the intake system directly upstream of the internal combustion engine 1 and the exhaust system directly downstream of the internal combustion engine 1 to be reciprocated. In particular, when fuel cut control is performed when the catalyst floor temperature of the exhaust purifying catalyst 46 is higher than a predetermined temperature, it is possible to hold the intake valve 28 and the exhaust valve 29 in states in which the new gas does not flow from the intake system of the internal combustion engine 1 to the exhaust system thereof.

In the above described embodiment, an example is described of when a structure in which the intake and exhaust valves are driven to open and close using electromagnetic force is used for the variable valve mechanism according to the invention, however, it is also possible to use a moving valve mechanism employing hydraulic pressure instead of electromagnetic force. Alternatively, in an internal combustion engine provided with a camshaft that drives the intake and exhaust valves to open and close using the rotation force of the crankshaft, it is also possible to use a moving valve mechanism which switches between operating and stopping the intake and exhaust valves by switching the mode of transmission of the driving force between the camshaft and the intake and exhaust valves. In addition, in an internal combustion engine provided with a camshaft that drives the intake and exhaust valves to open and close using the rotation force of the crankshaft, it is also possible to use a mechanical type of variable valve mechanism such as a moving valve mechanism that alters the opening and closing timings of the intake and exhaust valves by altering the rotation phase of the camshaft relative to the crankshaft.

While the systems of the invention have been described in conjunction with the specific embodiments outlined above, it is evident that many alternatives, modifications and variations will be apparent to those skilled in the art. Accordingly, the exemplary embodiments are intended to be illustrative, not limiting. Various changes may be made without departing from the spirit and scope of the invention.

What is claimed is:

1. A control method for an internal combustion engine provided with a variable valve mechanism capable of altering at least one of the opening and closing timings and opening amounts of at least one of an intake valve and an exhaust valve of an internal combustion engine, a fuel injection valve for supplying fuel to a combustion chamber of the internal combustion engine and an exhaust purifying catalyst provided in an exhaust system of the internal combustion engine, comprising:

a step of prohibiting the fuel injection valve from operating; and a step of controlling at least one of the intake valve and exhaust valve to always be placed in a closed state when fuel injection from the fuel injection valve is prohibited and when the temperature of the exhaust purifying catalyst is equal to or greater than a predetermined temperature.

2. The control method according to claim 1, wherein a time when the fuel injection valve is prohibited from operating is synchronized for each cylinder with a time at which at least one of the timings of the opening and closing of the intake valve and the exhaust valve are altered.

3. The control method according to claim 1, further comprising a step of resuming fuel injection after the intake valve and the exhaust valve have been operated for a predetermined number of cycles at their normal opening and closing timings, when fuel injection is resumed after the fuel injection has been prohibited.

4. A control method for an internal combustion engine provided with a variable valve mechanism capable of altering at least one of the opening and closing timings and opening amounts of at least one of an intake valve and an exhaust valve of an internal combustion engine, a fuel injection valve for supplying fuel to a cylinder of the internal combustion engine, and an exhaust purifying catalyst provided in an exhaust system of the internal combustion engine, comprising:

a step of prohibiting the fuel injection valve from operating; and a step of controlling, when the fuel injection valve is prohibited from operating, timings at which the intake valve and exhaust valve are opened and closed to be set at timings when gas flows from the exhaust system to the intake system of the internal combustion engine, wherein, when the fuel injection valve is prohibited from operating and when a temperature of the exhaust purifying catalyst is equal to or greater than a predetermined temperature, control is performed such that timings at which the intake valve and exhaust valve are opened and closed are set at the timings in which the opening period of the intake valve is provided at the timing when a piston of the internal combustion engine is rising upwards from the bottom dead center towards the top dead center, and the opening period of the exhaust valve is provided at the timing when the piston is dropping downwards from the top dead center towards the bottom dead center such that gas flows from the exhaust system to the intake system of the internal combustion engine.

5. The control method according to claim 4, wherein control is performed such that a time at which the timings of the opening and closing of the intake valve and exhaust valve are altered is synchronized with a time at which the fuel injection valve is prohibited from operating.

6. The control method according to claim 4, further comprising a step of resuming fuel injection after the intake valve and the exhaust valve have been operated for a predetermined number of cycles at their normal opening and closing timings, when fuel injection is resumed after the fuel injection has been prohibited.

7. The control method according to claim 4, wherein the internal combustion engine has a plurality of cylinders, wherein the variable valve mechanism is controlled, when the fuel injection valve is prohibited from operating, such that the opening and closing timings of the intake valve and exhaust valve of a portion of the plurality of cylinders are set at the timing at which gas flows from the exhaust system to the intake system of the internal combustion engine, and the opening and closing timings of the intake valve and exhaust valve of another portion of the plurality of cylinders are set at a timing at which gas flows from the intake system to the exhaust system of the internal combustion engine.

8. An internal combustion engine comprising:

a variable valve mechanism capable of at least one of altering opening and closing timings and opening amounts of at least one of an intake valve and an exhaust valve of an internal combustion engine;

a fuel injection valve for supplying fuel to a combustion chamber of the internal combustion engine;

forcible valve closing mechanism that controls the variable valve mechanism such that at least one of the intake valve and the exhaust valve is always placed in a closed state when the fuel injection valve is prohibited from operating;

an exhaust purifying catalyst provided in an exhaust system of the internal combustion engine, wherein the forcible valve closing device controls the variable valve mechanism such that at least one of the intake valve and the exhaust valve is always placed in a closed state when fuel injection from the fuel injection valve is prohibited and when the temperature of the exhaust purifying catalyst is equal to or greater than a predetermined temperature; and a fuel injection reset device that resumes fuel injection after the intake valve and the exhaust valve have been operated for a predetermined number of cycles at their normal opening and closing timings, when fuel injection is resumed after the fuel injection has been prohibited.

9. An internal combustion engine comprising:

a variable valve mechanism capable of at least one of altering opening and closing timings and opening amounts of at least one of an intake valve and an exhaust valve of an internal combustion engine;

a fuel injection valve for supplying fuel to a combustion chamber of the internal combustion engine;

forcible valve closing mechanism that controls the variable valve mechanism such that at least one of the intake valve and the exhaust valve is always placed in a closed state when the fuel injection valve is prohibited from operating; and an exhaust purifying catalyst provided in an exhaust system of the internal combustion engine, wherein the forcible valve closing device controls the variable valve mechanism such that at least one of the intake valve and the exhaust valve is always placed in a closed state when fuel injection from the fuel injection valve is prohibited and when the temperature of the exhaust purifying catalyst is equal to or greater than a predetermined temperature.

10. The internal combustion engine according to claim 9, wherein the variable valve mechanism is an electronic drive mechanism that drives the intake valve and the exhaust valve of the internal combustion engine to open and close using electromagnetic force.

11. The internal combustion engine according to claim 1, wherein the forcible valve closing mechanism synchronizes for each cylinder in the internal combustion engine a timing when the fuel injection valve is prohibited from operating with a timing when at least one of the intake valve and the exhaust valve are placed in a closed state.

12. The internal combustion engine according to claim 9, further comprising fuel injection reset device that resumes fuel injection after the intake valve and the exhaust valve have been operated for a predetermined number of cycles at their normal opening and closing timings, when fuel injection is resumed after the fuel injection has been prohibited.

13. An internal combustion engine comprising:
an intake system;
an exhaust system;
a variable valve mechanism capable of at least one of altering opening and closing timings and opening amounts of at least one of an intake valve and an exhaust valve of an internal combustion engine;
a fuel injection valve for supplying fuel to each cylinder of the internal combustion engine;
a valve timing altering means for controlling the variable valve mechanism, when the fuel injection valve is prohibited from operating, such that the timings at which the intake valve and exhaust valve are opened and closed are set at timings in which the opening period of the intake valve is provided at the timing when a piston of the internal combustion engine is rising upwards from the bottom dead center towards the top dead center, and the opening period of the exhaust valve is provided at the timing when the piston is dropping downwards from the top dead center towards the bottom dead center such that gas flows from the exhaust system to the intake system of the internal combustion engine; and
an exhaust purifying catalyst provided in an exhaust system of the internal combustion engine, wherein the valve timing altering device controls the variable valve mechanism such that the timings of the opening and closing of the intake valve and the exhaust valve are altered when fuel injection from the fuel injection valve is prohibited and when the temperature of the exhaust purifying catalyst is equal to or greater than a predetermined temperature.

14. The internal combustion engine according to claim 13, wherein the variable valve mechanism is an electronic drive mechanism that drives the intake valve and the exhaust valve of the internal combustion engine to open and close using electromagnetic force.

15. The internal combustion engine according to claim 13, wherein the valve timing altering means synchronizes for each cylinder a time when the fuel injection valve is prohibited from operating with a time at which at least one of the timings of the opening and closing of the intake valve and the exhaust valve are altered.

16. The internal combustion engine according to claim 13, further comprising fuel injection reset device that resumes fuel injection after the intake valve and the exhaust valve have been operated for a predetermined number of cycles at their normal opening and closing timings, when fuel injection is resumed after the fuel injection has been prohibited.

17. A control method for an internal combustion engine provided with a variable valve mechanism capable of altering at least one of the opening and closing timings and opening amounts of at least one of an intake valve and an exhaust valve of an internal combustion engine and a fuel injection valve for supplying fuel to a combustion chamber of the internal combustion engine and an exhaust purifying catalyst provided in an exhaust system of the internal combustion engine, comprising:
a step of prohibiting the fuel injection valve from operating;
a step of controlling at least one of the intake valve and exhaust valve to always be placed in a closed state when fuel injection from the fuel injection valve is prohibited; and
a step of resuming fuel injection after the intake valve and the exhaust valve have been operated for a predetermined number of cycles at their normal opening and closing timings, when fuel injection is resumed after the fuel injection has been prohibited.

18. An internal combustion engine comprising:
an intake system;
an exhaust system;
a variable valve mechanism capable of at least one of altering opening and closing timings and opening amounts of at least one of an intake valve and an exhaust valve of an internal combustion engine;
a fuel injection valve for supplying fuel to each cylinder of the internal combustion engine;
a valve timing altering means for controlling the variable valve mechanism, when the fuel injection valve is prohibited from operating, such that the timings at which the intake valve and exhaust valve are opened and closed are set at timings in which the opening period of the intake valve is provided at the timing when a piston of the internal combustion engine is rising upwards from the bottom dead center towards the top dead center, and the opening period of the exhaust valve is provided at the timing when the piston is dropping downwards from the top dead center towards the bottom dead center such that gas flows from the exhaust system to the intake system of the internal combustion engine;
a throttle valve provided in the intake pipe that adjusts an amount of air flowing through the intake pipe; and
an actuator that controls an opening amount of the throttle valve such that the throttle valve is in a completely closed state when the fuel injection valve is prohibited from operation.

19. An internal combustion engine comprising:
a plurality of cylinders;
an intake system;
an exhaust system;
a variable valve mechanism capable of at least one of altering opening and closing timings and opening amounts of at least one of an intake valve and an exhaust valve of an internal combustion engine;
a fuel injection valve for supplying fuel to each cylinder of the internal combustion engine; and
a valve timing altering means for controlling the variable valve mechanism, when the fuel injection valve is prohibited from operating, such that the timings at which the intake valve and exhaust valve are opened and closed are set at timings at which gas flows from the exhaust system to the intake system of the internal combustion engine, wherein the valve timing altering device controls the variable valve mechanism such that the opening and closing timings of the intake valve and exhaust valve of a portion of the plurality of cylinders are set at the timing at which gas flows from the exhaust system to the intake system of the internal combustion engine, and controls the variable valve mechanism such that the opening and closing timings of the intake valve and exhaust valve of another portion of the plurality of cylinders are set at a timing at which gas flows from the intake system to the exhaust system of the internal combustion engine.

* * * * *